Figure 1:
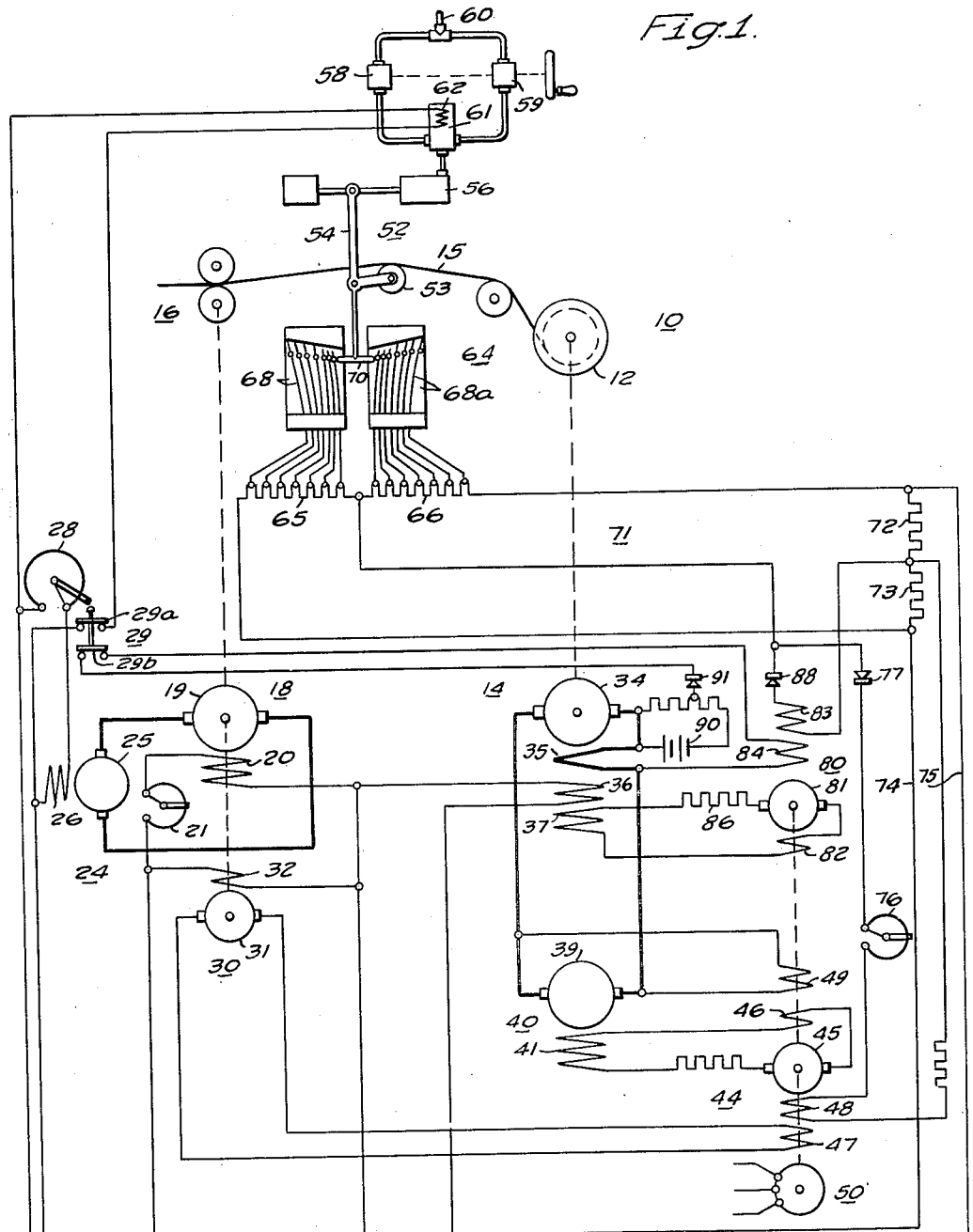

May 16, 1950            E. FRISCH            2,508,154

TENSION CONTROL SYSTEM

Filed July 17, 1947            2 Sheets-Sheet 1

WITNESSES:
E. A. M'Closkey
F. V. Giolma

INVENTOR
Erling Frisch.
L. M. Crawford
ATTORNEY

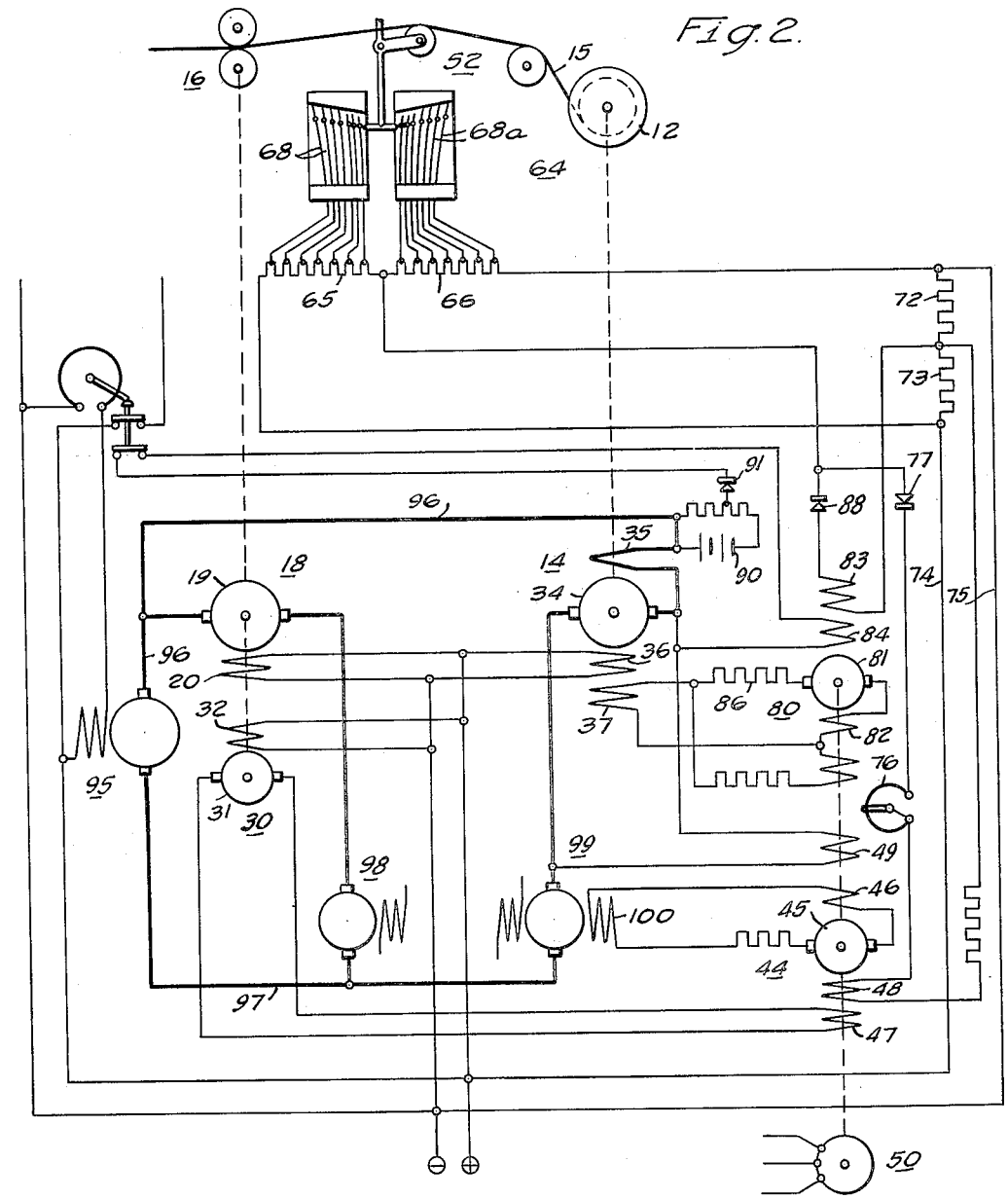

Patented May 16, 1950

2,508,154

UNITED STATES PATENT OFFICE 2,508,154

TENSION CONTROL SYSTEM

Erling Frisch, Pittsburgh, Pa., assignor to Westinghouse Electric Corporation, East Pittsburgh, Pa., a corporation of Pennsylvania Application July 17, 1947, Serial No. 761,707

12 Claims. (Cl. 242—75)

My invention relates, generally, to tension control systems, and it has reference, in particular, to control systems for reel motors and the like, such as are used in handling strip material under tension.

Generally stated, it is an object of my invention to provide a tension control system which is simple and inexpensive to manufacture, and which is reliable and effective in operation.

More specifically it is an object of my invention to provide for using a tension device in a tension control system for controlling a reel motor to regulate the strip tension and compensate for coil build-up.

Another object of my invention is to provide for using separate regulating generators in a tension control system to regulate the energization of both the field winding and the armature of a reel motor in response to the operating positions of a tension device.

Yet another object of my invention is to provide, in a tension control system, for controlling the operation of a reel motor by means of a regulating generator which is selectively responsive to both the operating position of the strip and the speed of the mill, so that the operating position of the strip, and its tension will be regulated under normal operating conditions, and the speed of the reel motor will be controlled in the event that the strip breaks.

It is an important object of my invention to provide, in a tension control system, for regulating the field strength of a reel motor in accordance with the operating position of a tension device which subjects the strip material to a tensioning force while it is being wound on the reel, and in accordance with the armature current of the reel motor under stalled conditions.

A further object of my invention is to provide, in a tension control system, for so regulating the voltage applied to a reel motor as to obtain reel speeds when the coil diameter is small which are in excess of those obtainable by field control alone, and to determine the threading speed or zero tension speed of the reel.

Still another object of my invention is to provide in a reel motor control system for automatically transferring from armature to field control of the reel motor, during a winding operation.

A yet further object of my invention is to provide, in a reel control system, for extending the speed range of a reel motor beyond the normal minimum weak field operating range by regulating the voltage applied to the armature of the reel motor.

Other objects will, in part, be obvious and will, in part, be explained hereinafter.

In practicing my invention in one of its forms, the strip material is tensioned by a tension device in the form of a tensiometer which subjects the strip to a transverse force to deflect it from its free position or path of travel and selectively varies the effective resistance of a pair of variable resistance elements in opposite senses, depending on whether the operating position of the strip is on one side or the other of a predetermined operating position. The armature of the reel motor is energized in accordance with the output voltage of a regulating generator which is responsive to the speed of an adjacent roll stand of the mill, and to the operating position of the tensiometer or of the strip material so long as it is on one side of the predetermined operating position. One reel motor field winding provides a maximum safe operating speed, and an additional or regulating field winding cumulative therewith is energized in accordance with the voltage of a regulating generator which is normally responsive to the operating position of the tensiometer or the strip material when it is on the other side of the predetermined operating position, so as to compensate for coil build-up. An auxiliary field winding on the latter regulating generator is connected, when the mill is stopped, for energization in accordance with the armature current of the reel motor, so as to limit the armature current under stalled conditions, yet permit the strip to be maintained under tension.

For a more complete understanding of the nature and scope of my invention, reference may be made to the following detailed description, which may be read in connection with the accompanying drawings, in which:

Figure 1 is a diagrammatic view of a reel control system embodying my invention in the form where separate generators are employed for supplying power to the reel and mill motors; and Fig. 2 is a diagrammatic view of a reel control system embodying a modification of my invention wherein a common generator is employed for supplying power to both the mill motor and the reel motor.

Referring to Fig. 1, the reference numeral 10 may denote, generally, a control system wherein a reel 12 is connected in driving relation with a motor 14 for winding a strip material 15 which passes between the rolls of a roll stand 16 driven by a mill motor 18.

The mill motor 18 may comprise an armature 19 and a field winding 20. The field winding 20 may be connected to a suitable source of control potential, represented by the conductors 22, in circuit relation with a field rheostat 21. The armature 19 may be energized from a main generator 24 having an armature 25 connected in series circuit relation with the armature 19, and provided with a field winding 26. The field winding 26 may be energized from the control conductors 22 through a field rheostat 28 having a limit switch 29 associated therewith which is actuated to the closed position when the rheostat is returned to the zero or "off" position, as shown. A pilot generator 30 may be provided in connection with the mill motor 18, having an armature 31 connected in driven relation with the armature 19 of the mill motor, and provided with a field winding 32 energized from the control conductors 22. The purpose of this generator is to produce a control voltage proportional to the speed of the strip 18, and which may be utilized in a manner which will be described more in detail hereinafter.

The reel motor 14 may comprise an armature 34, a compensating field winding 35, a main field winding 36, and a regulating field winding 37. The armature 34 may be connected to a suitable source of variable voltage being, for example, connected in series circuit relation with its compensating field winding 35 to the armature 39 of a reel motor generator 40 having a field winding 41.

The output voltage of the reel motor generator 40 may be controlled by means of a main regulating generator 44 having an armature 45 connected in series circuit relation with the field winding 41, a self-energizing field winding 46, a pattern field winding 47, a tension or position regulating field winding 48, and a differential voltage field winding 49. The regulating generator 44 may be driven by means of an alternating current motor 50.

In order to provide for controlling the operation of the reel motor 14 in accordance with the speed of the adjacent roll stand 16, the pattern field winding 47 of the regulating generator 44 may be connected to the armature 31 of the pilot generator 30 of the mill motor 18. The voltage field winding 49 may be connected across the armature 39 of the reel motor generator, so as to oppose the magneto-motive force of the pattern field winding 47 and provide for regulating the reel motor 14 in accordance with the speed of the mill motor 18.

In order to provide for controlling the operation of the reel motor to maintain a predetermined tension in the strip material 15, a tension device 52 may be provided for deflecting the strip from its free position comprising, a tension roll 53 disposed to bear against the strip 15, being, for example, rotatably mounted on a bell-crank lever 54 which may be actuated by a fluid-pressure device 56. Pressure regulating means 58 and 59 for providing relatively high and low fluid pressures from a source of fluid pressure represented by a conduit 60, may be provided in conjunction with an electromagnetic valve 61 having an operating winding 62, for selectively connecting the fluid-pressure device 56 for maintaining relatively high or relatively low actuating forces on the tension roll 53.

Regulating means 64, including control resistors 65 and 66 may be provided in conjunction with the tension device 52. These resistors may each have a plurality of flexible contact members 68 and 68a connected thereto at spaced intervals, and disposed to be actuated in opposite senses by an actuating member 70 connected to the bell crank lever 54, for progressively shunting and removing shunts from consecutive sections of the resistors. The resistors 65 and 66 may be so arranged that sections of the resistors 66 are progressively shorted when the tension roll 53 and the strip 15 operate above the predetermined operating position, and sections of the resistor 65 are progressively shorted whenever the tension roll 53 and the strip 15 move to positions below the predetermined operating position which it is desired to maintain.

The regulating field winding 48 of the main regulating generator 44 may be connected across a bridge circuit 71 comprising the variable control resistors 65 and 66, and fixed control resistors 72 and 73. The bridge circuit 71 may be connected to the control conductors 22 through conductors 74 and 75. A threading speed adjusting rheostat 76 may be connected in circuit relation with the field winding 48 for adjusting the empty reel speed or zero tension speed of the reel motor 14. A rectifier 77 may be connected in circuit relation with the rheostat 76 and the field winding 48, so as to permit energization of the control field winding 48 only when the tension roll 53 and the strip 15 are above the pre-determined operating position.

The main field winding 36 of the reel motor 14 may be energized from the control conductors 22, so as to provide a minimum weak field for limiting the maximum speed of the reel motor. The regulating field winding 37, which may be cumulative with respect to the main field winding 36, may be energized from a field regulating generator 80, having an armature 81, a self-energizing field winding 82, a regulating field winding 83, and a current limit field winding 84.

The self-energizing field winding 82 may be connected in series circuit relation with the armature 81, the regulating field winding 37 of the reel motor and a control resistor 86, so as to provide a tuned armature circuit.

The tension or position regulating field winding 83 may be connected in parallel circuit relation with the tension or position regulating field winding 48 of the main regulating generator 44 with a rectifier device 88 in series circuit relation therewith, so as to provide for energizing the field winding 83 only when the tension roll 53 and the strip material 15 move to a position below the predetermined normal operating position.

The current limit field winding 84 may be energized in accordance with the armature current of the reel motor 14, so as to provide for limiting the armature current thereof to a predetermined value.

In order to provide for rendering the current control field winding 84 effective under stalled conditions, it may be connected across the compensating field winding 35 of the reel motor through contact member 29b of the limit switch 29, which will be in the closed position only when the rheostat 28 is returned to the "off" position to stop the roll stand 16. A suitable source of voltage, such as the battery 90, may be connected in circuit relation with the field winding 84, so as to render this field winding effective only when the armature current of the reel motor 14 exceeds a predetermined value. A rectifier device 91 may be connected in circuit relation with the field winding 84 for preventing a reverse flow of current therethrough from the battery 90 when the armature current drops below the predetermined value.

In normal operation, the tension device will usually operate so that the tension roll 53 and the strip 15 are slightly below the normal operating position. Under this condition, the main regulating generator 44 is essentially a voltage regulator since the regulating field winding 48 will be deenergized, and the control field windings 47 and 49 operate to maintain the voltage of the reel motor generator 40 at a value which is directly proportional to the speed of the strip material 15.

The regulating field winding 48 serves a double purpose, in that it may modify the effect of the pattern field winding 47 during winding, and is effective to limit the reel speed during threading. It may serve in the first instance to raise the voltage of the reel motor generator 40 when the diameter of the coil on the reel 12 is small, so as to speed up the reel motor 14 to maintain the necessary speed. This is possible because the tension device 52 may, under this condition, operate in a position above the normal operating position, so that the field winding 48 is energized. This permits extending the speed range of the reel motor 14 over and above the range which is obtainable by field control through varying the energization of its regulating field winding 37.

Under this condition, the main regulating generator 44 operates as a tension regulator, since the tension device 52 will be in the upper portion of its operating range. Accordingly, the regulating field winding 48 of the main regulating generator is energized cumulatively with respect to the voltage or pattern field winding 47, so as to increase the voltage applied by the reel motor generator 40 to the armature 34 of the reel motor and thereby increase its armature current and torque, so as to restore the tension device to the normal operating position.

The other function of the regulating field winding 48 is to produce the correct reel motor speed for threading the empty reel and to prevent overspeeding of the reel motor in an attempt to restore the tension roll to the normal operating position, should the strip break. For the best results and assuming that the strip is being delivered to the reel, the reel motor should usually run at speeds on the order of 10 to 30 per cent higher than the normal delivery speed, in order to obtain satisfactory wrapping of a strip on the reel. During empty reel operation, the tensiometer or tension device 52 is in the minimum tension or maximum deflection position and all of the sections of resistor 66 are shorted out. The regulating field winding 48 will be energized cumulatively with the pattern field winding 47 and the threading speed 55 may be adjusted by setting the rheostat 76 to determine the field current of the field winding 48 to produce the desired empty reel speed under this condition.

During a winding operation, the diameter of the coil on the reel 12 continuously changes, or increases in the case of a winding-up reel. This results in the reel motor slowing down and the armature current increasing, which tends to produce increased tension of the strip 15. The tension roll 53 of the tension device 52 eventually moves position toward the minimum deflection position, and commences to short successive sections of the control resistor 65. The regulating field winding 48 of the regulating generator 44 is thereupon deenergized and the generator 44 thereupon becomes a voltage regulator. The regulating field winding 83 of the field regulating generator 80 is now energized. Accordingly, the regulating generator 80 increases the energization of the regulating field winding 37 of the reel motor 14, thus increasing the counter-electromotive force of the motor and reducing the armature current thereof. The tension device 52 is thereby restored toward its normal operating position.

The tension device 52 will ordinarily continue to operate slightly on the minimum deflection or high tension side, so that the regulating field winding 48 of the main regulating generator 44 is deenergized, and the regulating generator becomes effectively a voltage regulator, which maintains the voltage of the reel motor generator 40 at the value necessary to maintain the proper speed relationship between the reel motor 14 and the mill motor 18, by reason of interaction between the field windings 47 and 49. The field regulating generator 80 continues to progressively increase the energization of the regulating field winding 37 to maintain the tension roll 53 and the strip 15 in the proper operating positions.

When the mill is stopped before the winding of the reel is completed, the voltage of the pilot generator 30 drops to zero and the voltage of the reel generator 40 approaches the same value. This causes a reduction in the armature current of the reel motor 14 and, consequently, causes the tension roll 53 to move toward the maximum deflection position. The tension device 52 closes its low tension contacts 68a, and causes the field winding 48 of the main regulating generator 44 to be energized, so as to produce the voltage necessary to maintain the armature current of the reel motor at a value sufficient to hold the tension roll 53 and the strip material in the desired operating position. Since the regulating field winding 83 of the field regulating generator 80 is deenergized under these conditions, the armature current of the reel motor must be increased proportionately, and may reach a value of from two to three times rated current if it is not limited.

Since, under these conditions, the rheostat 28 of the mill motor generator 24 is returned to the "off" position, limit switch 29 operates to close contact members 29a and 29b. The operating winding 61 of the electromagnetic valve 60 is thereupon energized to transfer the fluid-pressure device 56 from its connection through the relatively high pressure regulating means 59, to the relatively low pressure regulating means 58, whereupon the tension device 52 is recalibrated for maintaining a lower value tension. At the same time, the current limit field winding 84 of the field regulator generator 80 is connected across the compensating field winding 35 of the reel motor for energization in the same sense as the regulating field winding 83. Accordingly, the regulating generator 80 becomes a current regulator, and energizes the regulating field winding 37 of the reel motor, so as to decrease the value of armature current necessary to maintain the desired tension in the strip 15.

Referring to Fig. 2, there is shown a reel control system similar to that of Fig. 1, except in that the reel motor 14 and the mill motor 18 are both energized from a common source of electrical energy, such as the main generator 95, through a main mill bus comprising conductors 96 and 97. Booster generators 98 and 99 may be connected in series circuit relation with the armatures 19 and 34 of the mill and reel motors, respectively, for regulating the voltages applied thereto from the main mill bus.

The field regulating generator 80 may be connected in a similar manner as described in connection with the system of Fig. 1 for controlling the energization of the regulating field winding 37 of the reel motor. In this instance, however, the main regulating generator 44 is connected to control the energization of a regulating field winding 100 of the booster generator 99, for controlling the energization of the armature 34 of the reel motor. In other respects, the systems of Fig. 1 and Fig. 2 are substantially identical and they operate in the same general manner.

During normal operation the contact members 68 of the regulating means 64 will be engaged and the regulating field winding 83 will be energized to effect energization of the regulating field winding 37 of the reel motor, so as to compensate for coil buildup. The regulating field winding 48 of the main regulating generator 44 is deenergized under these conditions and the generator 44 is essentially a speed regulator which regulates the output voltage of the booster generator to match the voltage applied to the reel motor armature against the speed of the mill motor 18. If the reel speed is slow when the coil diameter is small, the tension device 52 operates to energize the regulating field winding 48 so as to increase the voltage of the booster generator 99 and speed the reel motor up. When the mill is shut down, the regulating field winding 83 is energized to increase the reel motor field strength and reduce the armature current thereof.

From the above description and the accompanying drawings, it will be apparent that I have provided a simple and effective reel control system, wherein the regulation of strip tension and compensation for variations in coil diameter, or buildup in the case of a wind-up reel, are automatically regulated by means of regulating generators. By utilizing a main regulating generator which is responsive both to the speed of the adjacent mill stand and the operating position of a tension device tensioning a strip material when it is on one side of the predetermined desired operating position, I am able to transfer automatically from tension to voltage regulation, and thus extend the operating speed range of the reel motor beyond the value which may be obtained by field control alone. By predetermining the minimum energization of the tension regulating field winding of the main regulating generator, the threading or empty reel speed of the reel motor may be determined, and the motor will automatically hold this speed in the event that the strip breaks during a winding operation. By utilizing a common tension device for selectively controlling the operation of the main regulating generator or the field regulating generator, I am able to automatically compensate for variation in the diameter of the coil on the reel and maintain the proper speed relationship of the reel and mill motors as the winding operation proceeds. By utilizing an auxiliary current limit field winding on the field regulating generator, this generator may be automatically transferred to function as a current regulator when the mill is stalled, so as to prevent excessive armature currents in the reel motor.

Since certain changes may be made in the above-described construction and different embodiments of the invention may be made without departing from the spirit and scope thereof, it is intended that all the matter contained in the above description and shown in the accompanying drawings shall be considered as illustrative and not in a limiting sense.

I claim as my invention:

1. In a control system for a reel motor handling a strip material, tension means operable to produce a predetermined tension in the strip material, control means responsive to the operating position of the tension means and the speed of travel of the strip material to control the operation of the reel motor, and additional control means operable independently of the first mentioned control means to effect additional control of the reel motor in response to different operating positions of the tension means.

2. In a control system for a reel motor handling strip material, a tension device operable over a predetermined range for tensioning the strip material, control means responsive to operation of the tension device over one portion of the range and to the speed of the strip material operable to control the reel motor, and additional control means responsive to operation of the tension device over another portion of the range for effecting further control of the reel motor.

3. In a control system for a reel motor having an armature and a field winding, a tension device operable to tension a strip material handled by a reel having driving connection with the reel motor, control means including regulating means responsive to operation of the tension device and the speed of the strip connected to apply a control voltage to the motor armature, and additional control means connected to apply a control voltage to the field winding, including a regulating generator having a field winding connected in circuit relation with a rectifier device and bias voltage means for energization in accordance with the armature current of the reel motor when said current exceeds a predetermined value.

4. A control system for a reel motor having an armature and a field winding comprising, control means including regulating means responsive to the operating position of the strip and the speed thereof connected to effect energization of the reel motor armature, and additional control means connected to effect energization of the reel motor field winding, including generating means responsive to the armature current when it exceeds a predetermined value.

5. A reel system comprising, a reel motor having an armature and a field winding, a tension device operable in different positions to tension a strip material on the reel, said positions including positions above and below a predetermined normal position, control means responsive to operation of the tension device in positions above the predetermined normal position and to the speed of the strip material operable to control the energization of the reel motor armature, and additional control means responsive to operation of the tension device in positions below the normal position controlling the energization of the field winding.

6. In a control system for a reel handling strip material, a motor having a driving connection with the reel and having an armature and a field winding, tension means operable over a predetermined range to tension the strip material, regulating means producing a variable voltage proportional to the operating position of the tension means, a regulating generator jointly responsive to the speed of the strip and to said variable voltage connected to effect energization of the motor armature, and an additional regulating generator responsive to said variable voltage connected to effect energization of the motor field winding.

7. A control system for a reel winding a strip of material under tension from a mill stand comprising, a motor having a field winding and an armature connected in driving relation with the reel, a pilot generator operable to produce a voltage in accordance with the speed of the strip material, circuit means including a tension device responsive to the operating position of the strip material and to the voltage of the pilot generator connected to effect energization of the armature, and additional circuit means responsive to the operating position of the strip material and to the value of the reel motor armature current connected to effect energization of the field winding.

8. In a control system for a reel motor having an armature and a field winding, a tension device operable to tension a strip material on the reel, said tension device being actuable to different operating positions to produce a reversible control voltage, control means producing a voltage proportional to the speed of the strip material, control means jointly responsive to the speed responsive voltage and to the reversible voltage when it is of one polarity connected to effect energization of the reel motor armature, and additional circuit means responsive to the reversible voltage when of the opposite polarity connected to control the energization of the field winding.

9. A control system for a reel winding a strip of material passing through a rolling mill comprising, a reel motor having an armature disposed in driving relation with the reel and having a field winding, a tension device actuable to tension the strip material between the reel and the mill, circuit means including a regulating generator responsive to operation of the tension device and to the speed of the strip material connected to effect energization of the reel motor armature, an additional regulating generator normally responsive to operation of the tension device connected to effect energization of the reel motor field winding, and additional circuit means connected to control the operation of the additional regulating generator in response to the armature current of the reel motor when the mill is stopped.

10. In a control system for a reel winding a strip material from a rolling mill, a motor having an armature with a driving connection to the reel and having a plurality of field windings, circuit means connecting one of the motor field windings to a source of substantially constant voltage, a generator having an armature connected to apply a voltage to the motor armature and having a field winding, a regulating generator having an armature connected to supply electrical energy to the generator field winding, said regulating generator having a plurality of field windings including one field winding energized in accordance with the speed of the strip material and a differential field winding energized in accordance with the voltage applied to the motor armature, a tension device operable to tension the strip material, circuit means controlled by the tension device for producing a reversible control voltage in response to variation in the operating position of the tension device above and below a predetermined value, additional circuit means including a rectifier device connecting another field winding of said plurality of field windings on the regulating generator for energization in accordance with the reversible voltage when it is of one polarity, an additional regulating generator having an armature connected to energize another one of the motor field windings and having a plurality of field windings, circuit means including a rectifier device connecting one of said plurality of additional regulating generator field windings for energization in accordance with the reversible voltage when it is of the opposite polarity, and other circuit means including a rectifier device and switch means operable when the mill is stopped to energize another of the additional regulating generator field windings in accordance with the reel motor armature current.

11. In a control system for a reel handling a strip material passing between the rolls of a rolling mill having control means for starting and stopping the mill, a reel motor having a field winding and an armature connected in driving relation with the reel, a tension device normally disposed to bear against the strip with a predetermined force and operable to tension the strip material, regulating means responsive to predetermined operation of the tension device and the speed of the strip to effect energization of the reel motor armature, additional regulating means normally operable to effect energization of the reel motor field winding in response to operation of the tension device other than said predetermined operation, and switch means operable in response to operation of the control means to stop the mill to render the additional regulating means responsive to the armature current of the reel motor and to reduce the force with which the tension device bears against the strip material.

12. In a control system, a reel motor having a plurality of field windings and an armature having a driving connection with a reel winding a strip material passing through a rolling mill, circuit means including a booster generator connected in circuit relation with the reel motor armature for effecting energization thereof, a tension device operable to tension the strip material, a regulating generator responsive to predetermined operation of the tension device and to the speed of the rolling mill connected to control the output voltage of the booster generator, and an additional regulating generator responsive to operation of the tension device to control energization of the reel motor field winding.

ERLING FRISCH.

REFERENCES CITED

The following references are of record in the file of this patent:

UNITED STATES PATENTS

| Number | Name | Date |
| --- | --- | --- |
| 2,325,381 | Edwards et al. | July 27, 1943 |